(12) United States Patent
Luke

(10) Patent No.: US 9,254,582 B2
(45) Date of Patent: Feb. 9, 2016

(54) PROCESS FOR THE MANUFACTURE OF PHOSPHORUS REMOVAL AGGREGATE FROM FRACTIONATING SAND MINE WASTE PRODUCTS

(71) Applicant: Donald Allen Luke, Valrico, FL (US)

(72) Inventor: Donald Allen Luke, Valrico, FL (US)

(73) Assignee: CleanWater Technologies, LLC, Valrico, FL (US)

( * ) Notice: Subject to any disclaimer, the term of this patent is extended or adjusted under 35 U.S.C. 154(b) by 230 days.

(21) Appl. No.: 13/832,957

(22) Filed: Mar. 15, 2013

(65) Prior Publication Data

US 2014/0265063 A1    Sep. 18, 2014

Related U.S. Application Data

(63) Continuation-in-part of application No. 13/567,247, filed on Aug. 6, 2012.

(60) Provisional application No. 61/574,726, filed on Aug. 8, 2011.

(51) Int. Cl.
*B28C 7/00* (2006.01)
*C04B 18/02* (2006.01)
*C04B 38/00* (2006.01)
*B07B 1/00* (2006.01)
*C04B 111/00* (2006.01)

(52) U.S. Cl.
CPC .............. *B28C 7/0007* (2013.01); *C04B 18/023* (2013.01); *C04B 38/009* (2013.01); *B07B 1/00* (2013.01); *C04B 2111/00793* (2013.01); *Y02W 30/91* (2015.05); *Y02W 30/97* (2015.05)

(58) Field of Classification Search
CPC ..................................................... B28C 7/0007
See application file for complete search history.

(56) References Cited

U.S. PATENT DOCUMENTS

| | | | | |
|---|---|---|---|---|
| 4,402,833 A | * | 9/1983 | Bennett et al. | 210/667 |
| 5,368,741 A | * | 11/1994 | Munday et al. | 210/724 |
| 6,620,214 B2 | * | 9/2003 | McArdle et al. | 51/298 |
| 6,627,083 B2 | * | 9/2003 | Rennesund et al. | 210/660 |
| 7,655,088 B2 | * | 2/2010 | Bethani | 106/705 |
| 7,704,317 B2 | * | 4/2010 | Bethani | 106/705 |
| 7,780,781 B2 | * | 8/2010 | Bethani | 106/705 |
| 8,206,504 B2 | * | 6/2012 | Bethani | 106/705 |
| 8,349,070 B2 | * | 1/2013 | Bethani | 106/705 |
| 2002/0179534 A1 | * | 12/2002 | Rennesund et al. | 210/683 |
| 2009/0069181 A1 | * | 3/2009 | Boulos | 504/151 |

OTHER PUBLICATIONS

Mukherjee, The science of clays: applications in industry, engineering, and environment. (2013 Capital Publ. Co. New Delhi, India).

* cited by examiner

*Primary Examiner* — Joseph S Del Sole
*Assistant Examiner* — Russell Kemmerle, III
(74) *Attorney, Agent, or Firm* — Robert J. Varkonyi; Smith & Hopen, P.A.

(57) ABSTRACT

The present invention provides a process for producing granular material useful as a phosphorus removal aggregate and involves the mixing of a pulverized calcium or magnesium oxide material with a dewatered clay waste material in a paddle or ribbon type mixer until reaching a state of a uniform consistency paste like material and then allowing such material to cure for several days while periodically mixing to expose new surface area thereof to the air to facilitate evaporation until the water content of the cured material is less than six percent.

19 Claims, No Drawings

PROCESS FOR THE MANUFACTURE OF PHOSPHORUS REMOVAL AGGREGATE FROM FRACTIONATING SAND MINE WASTE PRODUCTS

This application is a Continuation-in-Part of U.S. patent application Ser. No. 13/567,247 filed Aug. 6, 2012 which claims priority from U.S. Provisional Application No. 61/574,726 filed Aug. 8, 2011

BACKGROUND OF THE INVENTION

1. Field of the Invention

The present invention relates in general to a process for the production of a phosphorus removal aggregate that is highly advantageous for removal of phosphorus from waste or storm water and more specifically concerns the production of such material from a fractionating sand mine waste product.

2. Description of the Prior Art

The prior art related to this subject matter is essentially divided into three different areas. First, stabilization of naturally occurring clay deposits for the general purpose of rendering them suitable load bearing soils, second, the production of lightweight aggregate materials from a variety of naturally occurring raw material and third, the mechanical incorporation of carbonates of calcium or magnesium in the aggregate material.

The literature describing stabilization of naturally occurring clays directed to the application or for the purpose of increasing soil stability is differentiated from the process and products of the present invention in that in such described applications, in-situ clays are never removed from their natural location and stabilization occurs through the creation of load bearing columns in one case, or in others, the creation of a load bearing crust within the top several inches or feet of the body to be stabilized. Such applications, by their very nature, are designed to facilitate the construction of roads or other structures in areas where this type of construction would otherwise be prohibited or at a minimum require the costly removal of the subsurface clay body and subsequent replacement with suitable construction quality soil.

In the case of the prior literature on the subject of manufacturing lightweight aggregate materials, it is important to note that the above process of the present invention is differentiated from other lightweight aggregate production processes in several significant ways. Traditional lightweight aggregates are produced by mining or otherwise extracting a natural deposit of clay which contains inherently incorporated organic matter, and firing that material in a rotary kiln. As such, the final product characteristics are dependent on the composition and make-up of the original clay deposit. The mining of natural deposits of clay produces as a starting material a clay of approximately 60%-80% solids, which starting material is thus suitable for immediate pyro-processing. However, it does have many disadvantages typically associated with the mining and extraction of naturally occurring mineral deposits including, but not limited to the remediation of the mining area, ecological disturbance, and the disposal of waste products.

The process of this invention, however, has none of those disadvantages. The starting material is itself a byproduct of mining activity. The use of such byproduct reduces the environmental impact of the mining activity in that were it not converted to a beneficial use product, it would require disposal in impoundment. As such, the process and associated products of this invention qualify as "green" products because as a result of their manufacture, environmental consequences are significantly reduced. In addition, the final products of the invention are capable of a degree of customization not available within the range of naturally produced lightweight aggregates. Products with greater mechanical strength, products with lower bulk density, products with greater insulating properties, than any product currently produced from naturally occurring clay deposits can be produced by use of the present invention with none of the environmental consequences normally associated with the production of lightweight aggregates from naturally occurring clay deposits.

The phosphorus removal aspect of this invention is novel over what is found in the prior art which consists of essentially using furnace slags naturally high in calcium or using man-made aggregates produced by the addition of limestone or calcium carbonate. Addition of either of these two materials would be a non starter in the instant process because they do not provide the initial dehydration provided by the addition of calcium oxide, a necessary element of such process. The initial dehydration or stabilization of the clay of this invention facilitates the additional processing into the various forms.

In the production of the phosphorus removal aggregate of the present invention, the only limitation on how much CaO can be incorporated is mechanical. The more CaO added, the more difficult it is to mechanically incorporate the CaO. However, the more CaO incorporated, the higher the sorption capacity the aggregate has for phosphorus.

One of the more relevant patents of the prior art is U.S. Pat. No. 6,627,083 B2 issued Sep. 30, 2003. But, the process disclosed therein differs from the present invention in that the clay it utilizes is a natural organic clay deposit in which carbonates of calcium or magnesium are incorporated as flux material. In contrast, the clay of the present invention does not contain any natural organic material, and as such is not by nature an expanding clay as the term is utilized generally in the production of lightweight aggregate materials. Further, the CaO thought to be bound or encapsulated in the ceramic matrix of the aggregate remains available to react with soluble phosphorus present in waste or storm water. In fact, the surprising result is that approximately 85% of the CaO is available to react, despite its encapsulation in the aggregate matrix.

BACKGROUND INFORMATION

Standard Silica Sand produced by normal mining and beneficiation processes is utilized by the oil and natural gas industry in significant quantity to facilitate efficient removal of oil and natural gas. The conventional process consists of first creating a bore hole or well into the oil or natural gas formation. The depths of the well may range from as little as a few hundred feet to many thousands of feet.

Once the initial oil or gas has been extracted by conventional means from a formation, many producers engage in a practice called hydraulic fracturing in which various liquids and liquid mixtures are pumped into the well under extreme pressures to cause the underground formation to fracture. Once the fractures are created, the fracturing liquid is removed and typically, a mixture containing fractionating sand is pumped in under similarly high pressures to fill the newly created fractures and effectively prop them open. The permeability of the sand allows additional oil or gas to be recovered by the operator resulting in greater recovery of oil or gas from each well location.

The process by which the fractionating sand products are produced is one of a variety or combination of traditional beneficiation processes such as crushing, washing, cycloning, screening, sizing or other unit operations as may be prudent and necessary to process raw mineral ore. A typical sand production process begins by extraction of the raw ore from the ground by traditional mining techniques whereupon the raw ore might be crushed and then further processed to separate the primary sand product from other components of the sand laden ore. Except perhaps in the case of alluvial sand deposits, sand typically isn't found in isolation, but rather exists as a constituent of an ore material rich enough in the desirable component to warrant the expense of excavation and separating the valuable sand material.

The other constituents of the raw ore material are typically waste rock, which can be utilized for road building and other such activities, and clays or silts, primarily an Aluminum Silicate compound such as Kaolinite, Illite, gibbsite or other clay like minerals typically small in particle size. In order to produce sand of acceptable purity, these clays must be liberated and separated from the sand. Typically, this is accomplished by washing because dry separation of these extremely fine particles in not usually practical.

The composite of the clay, or non sand portion of the original ore material normally is collected in the water phase of the processing operation where it exists as a fairly low density slurry which separates or dewaters very slowly. A variety of means are employed to accelerate this separation including water recovery operations such as thickeners and centrifuges, but most frequently, simple settling ponds utilizing large land areas which seldom are ever suitable for anything other than a pasture use. The sedimentation and consolidation of these settling areas takes many years and the clay sediment seldom if ever reaches its original or natural consolidated density.

As sand processing operations progress through the ore body, several settling areas may be required to accomplish storage of the clay waste material. The clay material stored in such settling areas has few beneficial uses in its native form unless it can be produced or converted to a form acceptable to the marketplace such as being used as an aggregate that is modified into a phosphorus removal product by the mechanical incorporation of calcium oxide therein.

The object of the present invention is to provide a process by which a normal sand production operation can be modified to include the recovery of the clay minerals present in the ore body to produce commercially desirable materials that can be utilized as phosphorus removal agents.

SUMMARY OF THE INVENTION

The present invention provides a process for the production of a variety of materials including a lightweight construction material from a fractionating sand mine waste product and involves the recovery of clay minerals present in a raw mineral ore body to produce commercially desirable materials that can be transformed into phosphorus removal agents.

The process of the invention broadly involves mixing a pulverized calcium, or magnesium oxide (or a mixture thereof) material and other compounds depending on the desired end use of the final product with a dewatered clay waste material in a suitable mixing device such as a pug mill, paddle or ribbon type mixer until the composition reaches a state of a uniformity or paste like consistency and then allowing such material to cure for several days while periodically mixing to expose new surface area thereof to the air to facilitate evaporation until the free water content of the cured material is less than four to six percent.

Other objects, features and advantages of the present invention will be readily appreciated from the following description. The description is based on a specific detailed process description. However, such description does not represent the full scope of the invention. The subject matter which the inventor regards as his invention is particularly pointed out and distinctly claimed in the claims at the conclusion of the specification.

DETAILED DESCRIPTION OF THE PREFERRED EMBODIMENT

The process by which fractionating sand products are produced, as is known in the art, is described above in the preceding sections. The following description is intended to describe the process from the point at which dilute clays are produced in the sand operation to the preparation of lightweight aggregate that is effective at removing phosphorus from waste or storm water.

A Sand Plant will normally perform preliminary dewatering of the dilute clay slurry to recover and recycle water. The resulting partially consolidated waste clay process stream typically is about 18%-35% solids, but may be more or less dilute. In the normal process, this waste clay stream would simply be placed in an above or below ground storage facility where it would gradually consolidate. In the modified process of the present invention, the waste clay process stream is further dewatered by conventional means such as centrifuges, filters, or even simple consolidation to a density of approximately 35% to 50% solids, which provides the necessary consistency for further processing into a variety of useful products.

One of the more useful products that can be produced from the waste clay is a product of the instant invention that provides a highly advantageous phosphorus removal aggregate for removing phosphorus from waste or storm water. The initial step in the process is to first combine a pulverized calcium oxide in the form of lime or magnesium oxide material with the dewatered clay. The process consists of simple mixing of these two components in a paddle or ribbon type mixer to a consistency whereby the aggregate contains as much CaO (2.5-50 percent) as can be physically incorporated during the process. This is a function of the starting density of the raw clay and essentially the horsepower of the mixing device. The resulting hydration of the calcium oxide to calcium hydroxide further dehydrates the mixture creating a stiff, paste like consistency amenable to further processing by extrusion or other discrete particle forming processes.

A further enhancement of the basic process is to add a fine organic material such as fine Canadian peat, Canadian peat fines or Canadian peat residue from Canadian peat processing during the initial clay stabilization process. The peat is mixed with the clay and lime in a ratio of approximately one-half-one lb of peat to ten lbs of clay. The peat, clay and lime are mixed in a single step. The addition of the organic material serves several purposes. First, it is combustible, and serves as a fuel source, thus reducing the overall fuel requirement of the kiln. Second, as each peat particle burns, it leaves behind an air void in the aggregate.

By varying the amount of peat added, fuel consumption can be reduced by up to 50%, and the average dry bulk density of the resulting aggregate can be reduced to approximately 42 lbs per cubic foot. Other materials may be substituted for the peat such as waste paper pulp, sawdust, or lake bottom sludge. The mixture was then heated over low temperature of 125° F. and periodically mixed while heating to ensure uniform drying until reaching about a 5% moisture level. The next step in the process is to fire the resulting mixture at a temperature in the range of 1800° F. to 2100° F.

Following below are several specific examples of the process of this invention. Raw clay was allowed to settle and consolidate to approximately 50% solids by simply settling and evaporation. Utilizing this raw material, several product mixtures for evaluating phosphorus removal were prepared. The early part of the work was to prepare 8 different aggregate compositions for the purpose of evaluating the phosphorous removal capability of the LWA in different forms, to compare aggregates with differing compositions, notably the lime concentration and the peat addition rate. Eight (8) individual aggregate mixes were prepared, fired, sized and the phosphorous removal capability was evaluated. The following table describes the individual mixes.

|    | Lime   | Peat   |
|----|--------|--------|
| 1. | 2.50%  | 0.00%  |
| 2. | 5.00%  | 0.00%  |
| 3. | 10.00% | 0.00%  |
| 4. | 2.50%  | 5.00%  |
| 5. | 5.00%  | 5.00%  |
| 6. | 10.00% | 5.00%  |
| 7. | 2.50%  | 10.00% |
| 8. | 5.00%  | 10.00% |

The mixes above were prepared individually in batches approximately 10 pounds. The mix was then heated over low temperature 125° F. and periodically mixed while heating to ensure uniform drying. During the mixing effort mechanical sizing took place to prepare a final mix suitable for firing. When the mix reached about 5% moisture, the samples were considered dry.

Aggregate Firing

Small portions of each of the above mixtures were fired at 3 temperatures 1850° F., 1950° F., and 2075° F., which was found to be the optimum temperature during earlier work. The lower temperature products were evaluated because mechanical strength was less of a concern than when the aggregate would be used in concrete. Each fired sample was then immersed in water for several days to evaluate the resulting mechanical strength and to determine whether the aggregates retained, or lost mechanical strength. The lowest temperature, 1850° F., was found to have a significant reduction in mechanical strength after immersion in water for several days, rendering it likely not suitable of the intended use. The products prepared at the two higher temperatures were found to have little to no change in this property upon immersion. The remaining unfired material of each composition was then fired at 1950° F., following the heat ramps profiles utilized for preparing the smaller samples. For example, the products were heated a rate of 500° F. per hour until they reached 1000° F., then at a rate of 250° F. per hour until they reached the final product temperature. The oven was held at the final temperature for 30 minutes, and then allowed to cool naturally until the product reached safe handling temperature of about 90° F.

Aggregate Sizing

The fired products were sieved through standard sieves to produce a ⅜", ¼", 4M, 8M, and −8M fractions. Each fraction was then tested for bulk density to verify individual fraction bulk density. As would be expected, the higher peat content samples exhibited the lowest bulk density.

Example 1

Phosphorous Removal

Individual samples of several aggregates, specifically, #1, 3, 6 and 8 above were selected for initial, or proof of concept testing. In this testing, 25 gr. of aggregate was placed in a mesh bag. The bag was then suspended in a beaker of water containing approximately 10 ppm phosphorous prepared by adding the appropriate amount of phosphoric acid to water treated with a reverse osmosis unit to ensure it contained no phosphorous. Onsite pH measurement showed a slight rise in water pH, indicating that the calcium in the lime was reacting with the phosphorous in the water. This pH result was confirmed for each of the above samples of aggregate. At this point, qualitative colorimetric analysis verified "substantially less than" 10 ppm in the water samples after aggregate immersion. In this initial qualitative testing, precision was not the highest, since the objective was simply to confirm an effect, not to quantify it.

Example 2

Phosphorus Removal

Further testing on the same 4 samples above was conducted with significantly higher precision. Based on the differing objectives for this second round of testing, a continuous or flow through approach was adopted to more closely simulate the manner in which the product would likely be utilized. An aquarium power head was obtained which pumped approximately 1 gallon per minute. The aforementioned mesh bags were utilized to contain the aggregate and then fitted into the power head like a carbon filter cartridge would be fitted for an aquarium. The water was forced to flow through the bag containing the aggregate. Five (5) gallons of water was prepared as described above to 10 ppm P content, a sample of which was retained for outside analysis. Onsite colorimetric analysis confirmed approximately 10 ppm, and later outside lab analysis confirmed the concentration at 11 ppm. The power head was fitted to the 5 gallon bucket and started and the water was sampled and retained every 5 minutes. After 1 hour, the pump was stopped to allow for analysis to be completed. Once removal was confirmed by the colorimetric method, additional phosphorus was added to the water reservoir to bring it back up to 10 ppm, the pump was restarted and sampling was resumed to evaluate the phosphorous loading capability of the individual aggregate. This process was repeated for 5 cycles. The colorimetric analysis showed that after approximately 5 cycles of reloading the water, the original 25 grams of aggregate was only removing minimal phosphorous. This work was done at 10 ppm to accelerate the loading and removal evaluations.

Example 3

Phosphorus Removal

Aggregate mix, #3, was tested at a starting concentration of 1 ppm and tested as described above. At the end of 10 cycles of P replenishment, there was no indication that the aggregate had reached final loading.

A group of representative water samples were submitted to an outside testing laboratory for confirmation of the colorimetric analysis.

The feed water sample—10 ppm analyzed at 11 ppm.
The feed water sample—1 ppm analyzed at 1.8 ppm.
The 5 minute water samples had an average analysis of 0.74 ppm when treating the 10 ppm water indicating a 92.6% removal efficiency.
The 5 minute water samples had an average analysis of 0.27 ppm when treating the 1 ppm water indicating an 85% removal efficiency.

The loading calculations in the high P concentration case indicate that each ton of aggregate containing 10% lime, will load to a minimum final concentration of approximately 124 lb of P per ton of aggregate in these forced loading tests. The theoretical or stoichiometric loading is calculated to be 143 lb/ton. This represents approximately 85% utilization of the lime within the aggregate. This high utilization of the lime within the matrix is somewhat unexpected in that it was assumed that a significant portion of the lime would be unreactive since it would likely be sealed within the aggregate ceramic matrix, however this high availability of the Ca was observed consistently at differing CaO incorporation ratios. Similarly, loading with products containing lesser amounts of lime loaded to approximately 80%-85% of the stoichiometric loading, while rendering treated water P concentrations significantly less than 1 ppm. This highly efficient utilization of the lime within the matrix provides significant manufacturing flexibility, product customization and cost control. The amount of CaO incorporated in the pre fired aggregate mixture is limited solely by the mechanical ability of the mixing device. These examples are illustrative only to demonstrate the high and surprising availability of the Ca in the aggregate matrix. Much higher phosphorus loading can be attained simply by increasing the Ca content of the prefired aggregate mixture.

Thus, the present invention has been described in an illustrative manner. It is to be understood that the terminology that has been used herein is intended to be in the nature of words of description rather than of limitation. Furthermore, whereas the present invention has been described with respect to a particular detailed process, it should be understood that other and further modifications apart from those shown or suggested herein may be made within the true spirit and scope of this invention.

What is claimed is:

1. A process for the manufacture of phosphorus removal aggregate, wherein the process comprises the steps:
    providing a pulverized material, wherein the pulverized material is calcium oxide, magnesium oxide, or a mixture thereof;
    forming a paste-like material, further comprising the steps:
        providing a dewatered clay waste material having a density of approximately 35% to 50% solids;
        adding a fine solid organic material to the dewatered clay waste material along with the pulverized material;
    mixing the pulverized material with the dewatered clay waste material in a mixing device until reaching a consistency of approximately 2.5 to 50% oxide material; and
    allowing the paste-like material to cure to a water content of 6% or less, wherein the cure is performed by:
        air drying; or
        by heating to low temperatures while periodically mixing to expose new surface area thereof to the air to facilitate evaporation.

2. The process as recited in claim 1, further comprising kilning the cured material in a batch or rotary kiln, further comprising the steps of
    heating the cured material to a temperature of approximately 1800 to 2000° F. for 30 to 60 minutes; and
    allowing the cured material to cool.

3. The process of claim 2, wherein the step of heating the cured material is performed at a rate of 500° F. per hour until the material reached a temperature of 1,000° F., and wherein the step of heating the cured material is performed at a rate of 250° F. per hour when the material is above a temperature of 1,000° F.

4. The process of claim 3, wherein the cured material is held at final temperature for 30 minutes.

5. The process as recited in claim 1, wherein the fine solid organic material is Canadian peat, Canadian peat fines or dust residue form Canadian peat processing.

6. The process of claim 5, wherein the fine organic solid material is added at ½ pounds to 1 pound of fine solid organic material to 10 pounds of clay waste material.

7. The process of claim 5, further comprising:
    heating the mixed pulverized material and dewatered clay waste material to 125° F.; and
    mixing the heated pulverized material and dewatered clay waste material to a uniform composition prior to kilning, where the uniform composition has a water content of about 5%.

8. The process as recited in claim 1, wherein the fine solid organic material is saw dust, or wood residue originating from the processing of raw timber into lumber or other products.

9. The process as recited in claim 1, wherein the fine solid organic material is waste cellulose fiber produced as a byproduct of the manufacturing of paper products.

10. The process as recited in claim 1, wherein the fine solid organic material is lake bottom sludge or partially decayed vegetation removed from lakes and water bodies during remediation and depth restoration efforts.

11. The process as recited in claim 1, wherein said mixing device is a paddle, ribbon or pug mill type mixer.

12. The process of claim 1, wherein the clay waste material is kaolinite, illite, or gibbsite.

13. The process of claim 1, wherein the clay waste material is dewatered in a settling pond, centrifuged, or flocculated using thickeners.

14. The process of claim 1, further comprising centrifuging, filtering, or thickening the dewatered clay waste material before mixing the pulverized material with the dewatered clay waste material.

15. A process for the manufacture of phosphorus removal aggregate, wherein the process comprises the steps:
    providing a pulverized material, wherein the pulverized material is calcium oxide, magnesium oxide, or a mixture thereof;
    forming a paste-like material, further comprising the steps:
        providing a dewatered clay waste material having a density of approximately 35% to 50% solids;
    mixing the pulverized material with the dewatered clay waste material in a mixing device until reaching a consistency of approximately 2.5 to 50% oxide material; and
    allowing the paste-like material to cure to a water content of 6% or less, wherein the cure is performed by:
        air drying; or
        by heating to low temperatures while periodically mixing to expose new surface area thereof to the air to facilitate evaporation.

16. The process as recited in claim 15, further comprising kilning the cured material in a batch or rotary kiln, further comprising the steps of
    heating the cured material to a temperature of approximately 1800 to 2000° F. for 30 to 60 minutes; and
    allowing the cured material to cool.

17. The process as recited in claim 15, further comprising adding a fine solid organic material to the dewatered clay waste material, wherein the fine solid organic material is peat, wood processing byproduct, cellulose byproduct, or vegetation;
    wherein the peat is Canadian peat, Canadian peat fines or dust residue form Canadian peat processing;

wherein the wood processing byproduct is saw dust, or wood residue originating from the processing of raw timber into lumber or other products;

wherein the cellulose byproduct is waste cellulose fiber produced as a byproduct of the manufacturing of paper products; and wherein the vegetation is lake bottom sludge or partially decayed vegetation removed from lakes and water bodies during remediation and depth restoration efforts.

18. The process of claim 15, further comprising:

heating the mixed pulverized material and dewatered clay waste material to 125° F.; and mixing the heated pulverized material and dewatered clay waste material to a uniform composition prior to kilning, where the uniform composition has a water content of about 5%.

19. The process of claim 15, further comprising centrifuging, filtering, or thickening the dewatered clay waste material before mixing the pulverized material with the dewatered clay waste material.

* * * * *